Mar. 6, 1923.

J. G. BOSWELL.
MILL.
FILED AUG. 10, 1921.

1,447,834.

2 SHEETS—SHEET 2.

Inventor
J. G. Boswell

By *[signature]*
Attorney

Patented Mar. 6, 1923.

1,447,834

UNITED STATES PATENT OFFICE.

JAMES G. BOSWELL, OF WEEKS, LOUISIANA.

MILL.

Application filed August 10, 1921. Serial No. 491,186.

*To all whom it may concern:*

Be it known that I, JAMES G. BOSWELL, a citizen of the United States, residing at Weeks, in the county of Iberia and State of Louisiana, have invented certain new and useful Improvements in Mills; and I do hereby declare the following to be a full, clear, and exact description of the invention, such as will enable others skilled in the art to which it appertains to make and use the same.

The object of the invention is to provide a shear or cutting mill designed to operate by a shearing or cutting action as distinguished from the rubbing or like action incident to burr mills and the like, and capable of grinding wet green material without choking and under conditions which provide for the control of the material in its passage through the mill with a minimum of strain upon the bearing boxes and an economy in the power required for operation; and with this object in view, the invention consists in a construction, combination, and relation of parts of which a preferred embodiment is shown in the accompanying drawings, wherein:—

Figure 1:
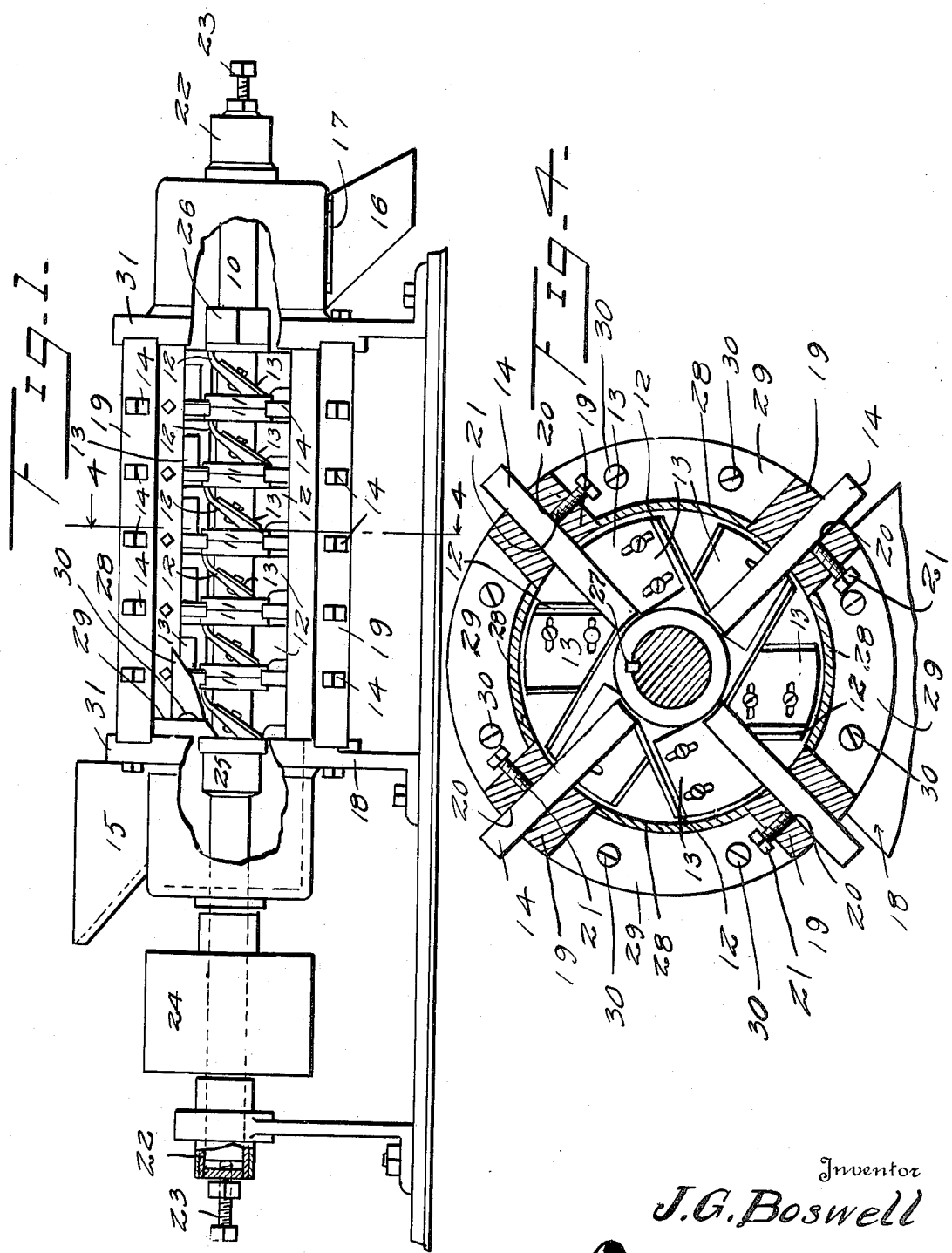
Figure 2:
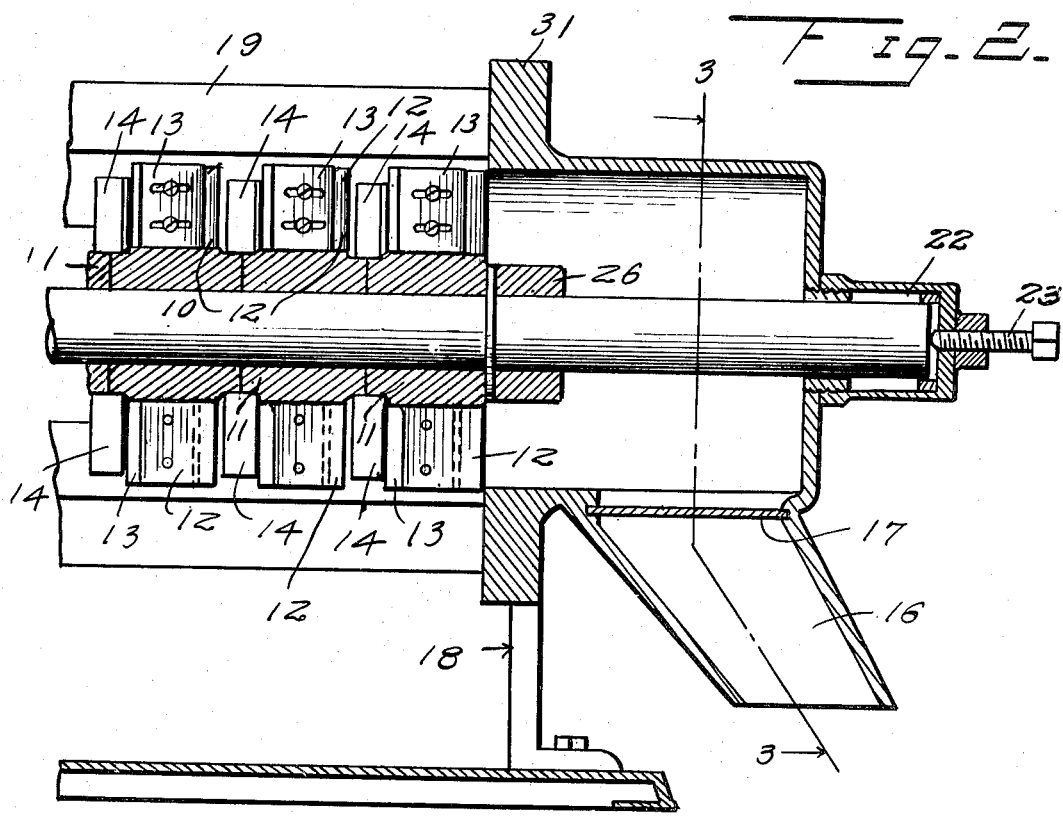
Figure 3:
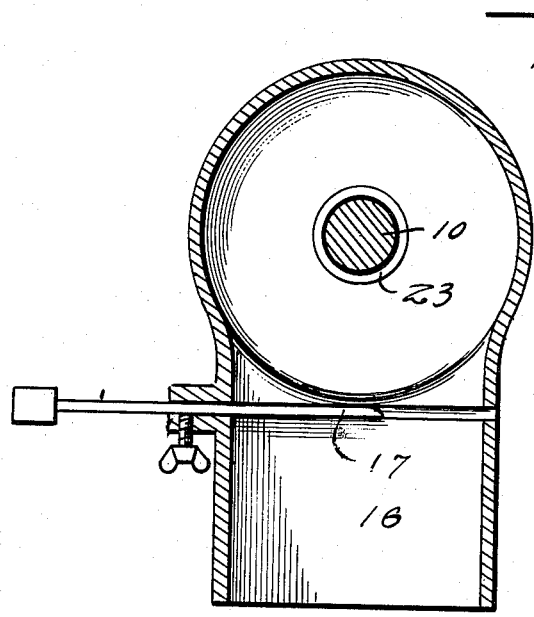

Figure 1 is a side view partially broken away of a mill embodying the invention, Figure 2 is a longitudinal section of the same, Figure 3 is a transverse section on the plane indicated by the line 3—3 of Figure 2, Figure 4 is a similar section on the plane indicated by the line 4—4 of Figure 1.

The mill consists primarily of a revoluble arbor 10 carrying a plurality of heads 11 provided with blast producing wings 12 which also constitute supports for movable knives 13 operating in connection with stationary knives 14, a feed hopper 15 at one end of the apparatus, an outlet chute 16 at the other end of the apparatus, access to the outlet chute being controlled by a gate or valve 17, and means for axially adjusting the arbor to control the relation between the movable and stationary blades.

In the construction illustrated the frame 18 which otherwise may be of any suitable or preferred construction, includes longitudinal supporting bars 19 having seats 20 in which are fitted the bars constituting the stationary blades 14 which are disposed radially with relation to the arbor with their side surfaces positioned to cooperate with the cutting edges of the movable blades 13 in producing a shearing cut. These bars 14 constituting the stationary blades are secured in their seats by set screws 21, and carried by the bearings (preferably anti-frictional) 22. At opposite ends of the arbor are the regulating screws 23 bearing terminally against the ends of the arbor and adjustable to vary the latter axially and hence adjusting the movable blades 13 with relation to the stationary blades 14 to compensate for wear, said movable blades thus being arranged in self-sharpening relation with the stationary blades.

The arbor may be actuated in any suitable manner and by any preferred power as for example through a pulley 24, and the cutter heads are assembled upon the arbor between the collar 25 and the nut 26 and are held from rotation independently of the arbor by means of keys 27.

The blades 12 which constitute the supports or holders for the movable blades are curved as indicated to adapt them to advance the material in its progress through the mill subject to the choking or throttling effect of the valve or gate 17 and the reduction of the material by the cutting or shearing action instead of by attrition or grinding or friction as in other forms of mills minimizes the power necessary to operate the apparatus and at the same time insures the required fineness of the product variable by the length of time which it is subjected in progress to the cutting action without tendency to choke or check the progress and thus interfere with the operation of the mechanism.

The sides of the casing between the longitudinal bars 19 are represented by removable panels 28 carried by flanges 29 which are adapted to be secured by screws 30 or the equivalent thereof to the heads 31 which are supported by the standards 18 and are of annular form to permit of the feed and discharge of the material.

Having thus described my invention what I claim is:—

In combination with a supporting structure comprising spaced uprights having bearings and longitudinal connecting bars, a rotary arbor mounted in the bearings, cutter heads mounted on the arbor, blast forming wings carried by the cutter heads, cutter blades carried by the blast forming wings and longitudinally adjustable relative to the arbor, blades between said longitudinal connecting bars, stationary blades mounted on the longitudinally connecting bars and disposed radially of the arbor, and means permitting radial adjustment of said stationary blades relative to said arbor carried blades, and said stationary blades being disposed in shearing relation to the arbor carried blades.

In testimony whereof I affix my signature in presence of two witnesses.

JAMES G. BOSWELL.

Witnesses:
R. N. BAUER,
HILDA L. WISE.